(12) United States Patent
Yamashita (10) Patent No.: US 9,217,236 B2
(45) Date of Patent: Dec. 22, 2015

(54) WORK VEHICLE (71) Applicant: KOMATSU LTD., Tokyo (JP)

(72) Inventor: Hiroshi Yamashita, Takatsuki (JP)

(73) Assignee: KOMATSU LTD., Tokyo (JP)

( * ) Notice: Subject to any disclaimer, the term of this patent is extended or adjusted under 35 U.S.C. 154(b) by 127 days.

(21) Appl. No.: 14/350,422

(22) PCT Filed: Dec. 27, 2013

(86) PCT No.: PCT/JP2013/085240
§ 371 (c)(1),
(2) Date: Apr. 8, 2014

(87) PCT Pub. No.: WO2014/192197
PCT Pub. Date: Dec. 4, 2014

(65) Prior Publication Data
US 2015/0315764 A1 Nov. 5, 2015

(51) Int. Cl.
*F01N 3/10* (2006.01)
*E02F 9/08* (2006.01)
*F01N 3/20* (2006.01)

(52) U.S. Cl.
CPC .............. *E02F 9/0866* (2013.01); *E02F 9/0883* (2013.01); *F01N 3/206* (2013.01)

(58) Field of Classification Search
CPC ....... F01N 3/206; F01N 3/2066; F01N 3/035; F01N 3/208; F01N 13/009; E02F 9/0083; E02F 9/0866
See application file for complete search history.

(56) References Cited

U.S. PATENT DOCUMENTS

| | | | | |
|---|---|---|---|---|
| 5,634,713 A | * | 6/1997 | Abe | B01F 13/0211 366/102 |
| 6,021,759 A | * | 2/2000 | Okajima | F02M 37/0041 123/467 |
| 7,497,076 B2 | * | 3/2009 | Funk | B01D 53/9431 60/286 |
| 8,453,791 B2 | * | 6/2013 | Wakatsuki | F01N 1/02 181/227 |
| 8,505,283 B2 | * | 8/2013 | Oda | F01N 3/106 60/295 |
| 8,973,353 B2 | * | 3/2015 | Sawada | F01N 3/10 60/286 |

(Continued)

FOREIGN PATENT DOCUMENTS

| | | |
|---|---|---|
| JP | 2009-68348 A | 4/2009 |
| JP | 2010-261373 A | 11/2010 |

(Continued)

OTHER PUBLICATIONS

International Search Report for the corresponding international application No. PCT/JP2013/085240, issued on Mar. 25, 2014.

*Primary Examiner* — Brodie Follman
(74) *Attorney, Agent, or Firm* — Global IP Counselors, LLP (57) ABSTRACT A hydraulic excavator includes a urea aqueous solution injection device, a urea aqueous solution tank, a pump, a first pipe, and a second pipe. The urea aqueous solution injection device is disposed in an engine compartment, and injects an aqueous solution of urea to clean exhaust gas. The urea aqueous solution tank stores the aqueous solution of urea. The pump draws up the aqueous solution of urea form the urea aqueous solution tank and supplies it to the urea aqueous solution injection device. The first pipe connects the reductant tank to the pump, and supplies the aqueous solution of urea from the reductant tank to the pump. The second pipe connects the pump to the reductant injection device, supplies the aqueous solution of urea from the pump to the reductant injection device, and has a smaller inside diameter than the first pipe.

10 Claims, 7 Drawing Sheets

(56) References Cited

U.S. PATENT DOCUMENTS

| | | | |
|---|---|---|---|
| 9,032,711 B2 * | 5/2015 | Bisaiji | B01D 53/9422 60/277 |
| 9,103,259 B2 * | 8/2015 | Uenishi | F01N 9/00 60/286 |
| 2010/0064670 A1 * | 3/2010 | Starck | F01N 3/2066 60/295 |
| 2010/0242439 A1 * | 9/2010 | Domon | B01D 53/9431 60/274 |
| 2011/0125387 A1 * | 5/2011 | Suzuki | F02D 41/126 701/103 |
| 2012/0325837 A1 * | 12/2012 | Amagasaki | F01N 3/2066 220/745 |
| 2014/0286827 A1 * | 9/2014 | Kawada | B01D 53/22 422/108 |
| 2015/0000256 A1 * | 1/2015 | Kobayashi | F01N 3/10 60/282 |
| 2015/0136514 A1 * | 5/2015 | Arai | E02F 3/764 180/309 |
| 2015/0192052 A1 * | 7/2015 | Ogawa | F01N 3/208 60/295 |

FOREIGN PATENT DOCUMENTS

| | | |
|---|---|---|
| JP | 2010-285814 A | 12/2010 |
| WO | 2013/175981 A1 | 11/2013 |

* cited by examiner

WORK VEHICLE

CROSS-REFERENCE TO RELATED APPLICATIONS

This application is a U.S. National stage application of International Application No. PCT/JP2013/085240, filed on Dec. 27, 2013.

BACKGROUND

1. Field of the Invention

The present invention relates to a work vehicle having an exhaust gas cleaning function.

2. Description of the Related Art

Selective catalytic reduction (SCR) devices that use a reductant to remove nitrogen oxides (NOx) contained in exhaust gases from an engine have been installed in hydraulic excavators and other such work vehicles in recent years.

For example, Japanese Laid-Open Patent Application 2010-261373 (laid open Nov. 18, 2010) discloses the configuration of a hydraulic excavator comprising an SCR (selective catalytic reduction) system for supplying a reductant from a reductant tank containing a reductant, through a pipe to a reductant supply device.

SUMMARY

However, with the hydraulic excavator configuration disclosed in the above-mentioned publication, the reductant tank is installed outside of the engine compartment to avoid the high-temperature environment inside the engine compartment. The reductant contained in the reductant tank is drawn up by a reductant pump and supplied through a pipe to the reductant supply device. Because a reductant injection device for injecting the reductant into the exhaust gas is usually disposed inside the engine compartment, the pipe that supplies the reductant to the reductant injection device passes through the engine compartment.

If the heat inside the engine compartment raises the temperature of the reductant, then the reductant will be warmer just prior to being injected. Consequently, it is more likely that the reductant will adhere to the nozzle of the reductant injection device, and this can shorten the service life of the reductant injection device.

It is an object of the present invention to provide a work vehicle with which the temperature increase of the reductant supplied to the reductant injection device can be suppressed.

The work vehicle pertaining to the first invention comprises a reductant injection device, a reductant tank, a reductant pump, a first pipe, and a second pipe. The reductant injection device is disposed in the engine compartment and injects a reductant used for cleaning exhaust gas into the exhaust gas. The reductant tank stores the reductant. The reductant pump draws up the reductant from the reductant tank and supplies it to the reductant injection device. The first pipe connects the reductant tank to the reductant pump, and supplies the reductant from the reductant tank to the reductant pump. The second pipe connects the reductant pump to the reductant injection device, supplies the reductant from the reductant pump to the reductant injection device, and has a smaller inside diameter than the first pipe.

Here, with the first pipe that leads to the reductant pump and the reductant tank installed in the engine compartment, and the second pipe that leads to the reductant pump and the reductant injection device, the inside diameter of the second pipe is made smaller than that of the first pipe.

Consequently, because the heat resistance of the second pipe is higher, the reductant passing through the second pipe is affected by heat less than with a conventional configuration in which the first and second pipes have substantially the same inside diameter.

More precisely, at a given wall thickness of a pipe, if the inside diameter of the pipe is reduced, the outside diameter of the pipe will also be smaller and the pipe surface area will also be reduced, so the amount of heat that affects the reductant passing through the interior of the pipe can be reduced.

As a result, this effectively suppresses the temperature elevation that occurs when the second pipe linked to a reductant injection device installed in an engine compartment is affected by the heat inside the engine compartment. Thus, this prevents the shortening of the service life of the reductant injection device caused by a rise in reductant temperature.

The work vehicle pertaining to the second invention is the work vehicle pertaining to the first invention, wherein the second pipe is disposed to pass through the engine compartment in which the engine is disposed.

Here, the second pipe that connects the reductant pump to the reductant injection device installed in the engine compartment is disposed to pass through the engine compartment.

Consequently, even though part of the second pipe passes through the engine compartment, because the inside diameter of the second pipe is reduced as mentioned above, the effect of heat produced in the engine compartment on the reductant flowing through the second pipe is reduced.

The work vehicle pertaining to the third invention is the work vehicle pertaining to the first or second invention, wherein the reductant injection device is disposed on the vehicle body rear side of the engine in the engine compartment.

Here, the reductant injection device that injects the reductant into the exhaust gas of the engine is disposed on the vehicle body rear side of the engine in the engine compartment.

Consequently, the portion of the second pipe connected to the reductant injection device that passes through the engine compartment is increased.

However, with this work vehicle, because the above-mentioned reduction in the inside diameter of the second pipe diminishes the effect of heat in the engine compartment, the reductant is not affected as much by this heat.

The work vehicle pertaining to the fourth invention is the work vehicle pertaining to any of the first to third inventions, wherein the reductant tank and the reductant pump are disposed on the outside of the engine compartment and on the vehicle body front side of the engine compartment.

Here, the reductant pump and the reductant tank for supplying reductant to the reductant injection device are disposed on the vehicle body front side of the engine compartment, outside of the engine compartment.

Consequently, although the first pipe that links the reductant tank and the reductant pump is not disposed in the engine compartment, at least part of the second pipe that links the reductant pump and the reductant injection device passes through the engine compartment.

With this work vehicle, however, because the above-mentioned reduction in the inside diameter of the second pipe diminishes the effect of heat in the engine compartment, the reductant is not affected as much by this heat.

The work vehicle pertaining to the fifth invention is the work vehicle pertaining to any of the first to fourth inventions, wherein the reductant is an aqueous solution of urea.

Here, an aqueous solution of urea is used as the reductant. In the present invention, the term "reductant" refers collectively to reductants and reductant precursors.

Also, when an aqueous solution of urea is used as the reductant, there is the risk that it will be modified into ammonia in a short time under a high-temperature environment of 70° C. or higher, for example.

With this work vehicle, because the above-mentioned reduction in the inside diameter of the second pipe diminishes the effect of heat in the engine compartment, the aqueous solution of urea is not as likely to be modified into ammonia.

With the work vehicle pertaining to the present invention, the temperature elevation of a reductant supplied to a reductant injection device can be suppressed.

DETAILED DESCRIPTION OF EXEMPLARY EMBODIMENTS

The hydraulic excavator (work vehicle) 1 in accordance with an exemplary embodiment of the present invention will now be described through reference to FIGS. 1 to 7b.

The "front and back" and "left and right" directions referred to in the following description mean the "front and back" and "left and right" directions as viewed by the operator seated inside a cab 8 of a hydraulic excavator 1.

Overall Configuration of Hydraulic Excavator 1

Figure 1:
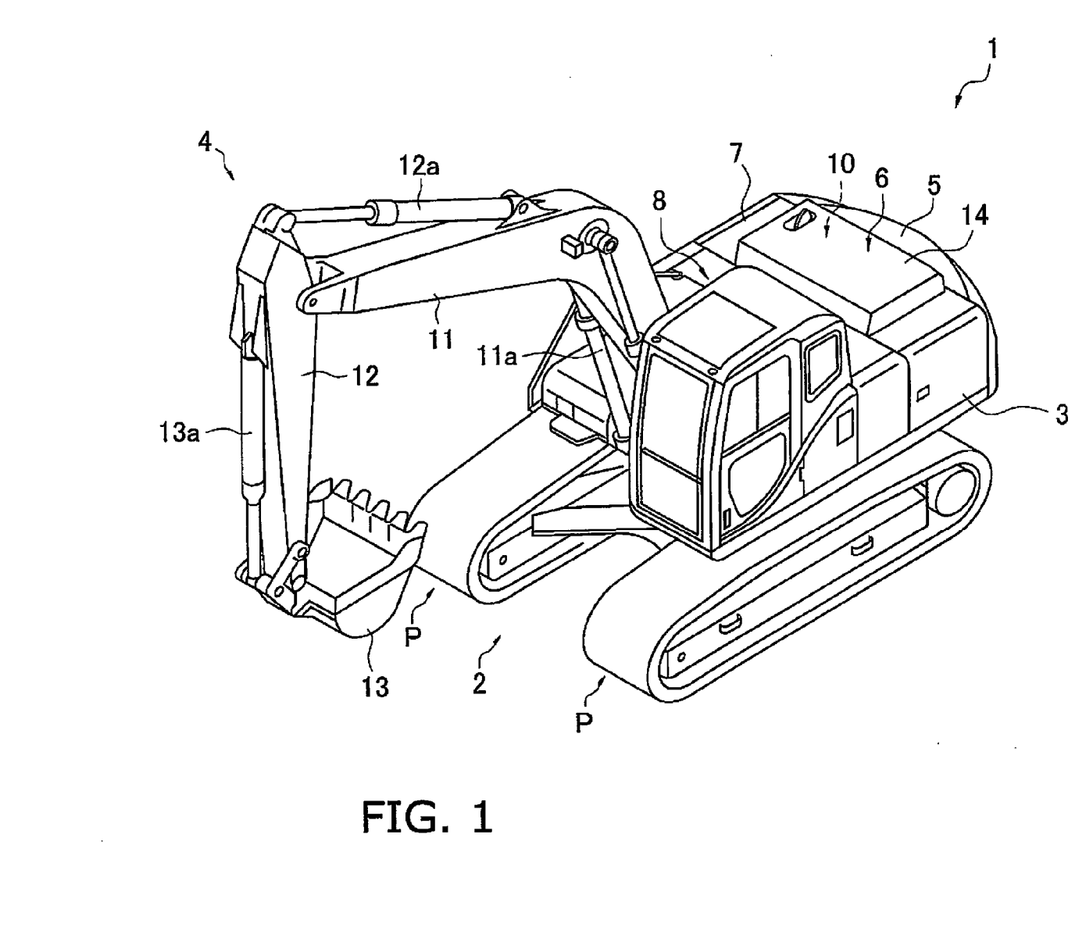
FIG. 1 is an oblique view of the overall configuration of the hydraulic excavator pertaining to an exemplary embodiment of the present invention.

As shown in FIG. 1, the hydraulic excavator 1 pertaining to this embodiment comprises a lower travelling unit 2, an upper structure 3, a work implement 4, a counterweight 5, a vehicle body 6, a mechanical compartment 7, and the cab 8.

The lower travelling unit 2 rotates a crawler belt P wound around left and right end portions in the forward direction, which allows the hydraulic excavator 1 to move forward and backward. The lower travelling unit 2 has the upper structure 3 mounted on its upper face.

The upper structure 3 is attached to the lower travelling unit 2 in a revolvable state. The upper structure 3 has the work implement 4, the counterweight 5, the vehicle body 6, the mechanical compartment 7, the cab 8, and an engine compartment 10 mounted on the upper face of a vehicle body frame 3a (FIGS. 2 and 3) that constitutes the base portion of the upper structure 3.

A plurality of pillar members 51 to 56 and a plurality of beam members 41 to 43 are provided on the vehicle body frame 3a, as shown in FIGS. 2-4 and 6.

Figure 2:
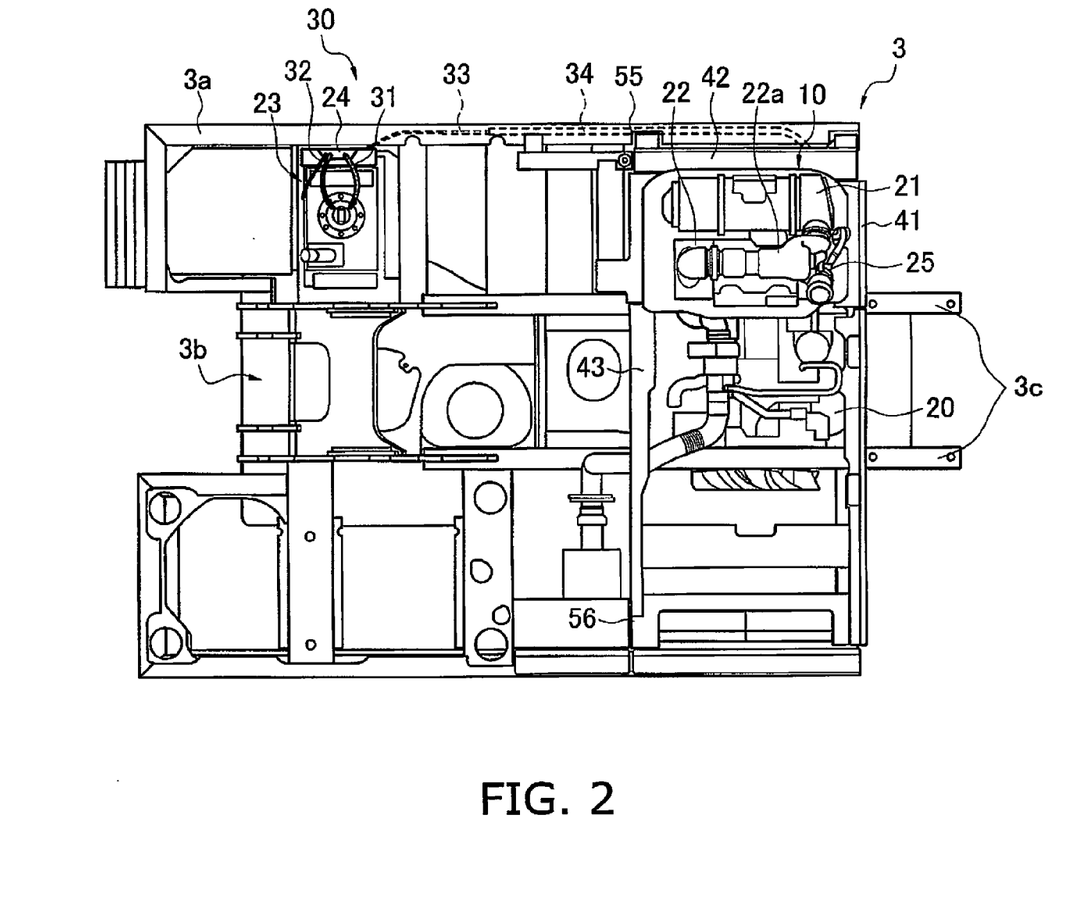
FIG. 2 is a plan view of a configuration disposed on the vehicle body frame of the hydraulic excavator of FIG. 1.
Figure 3:
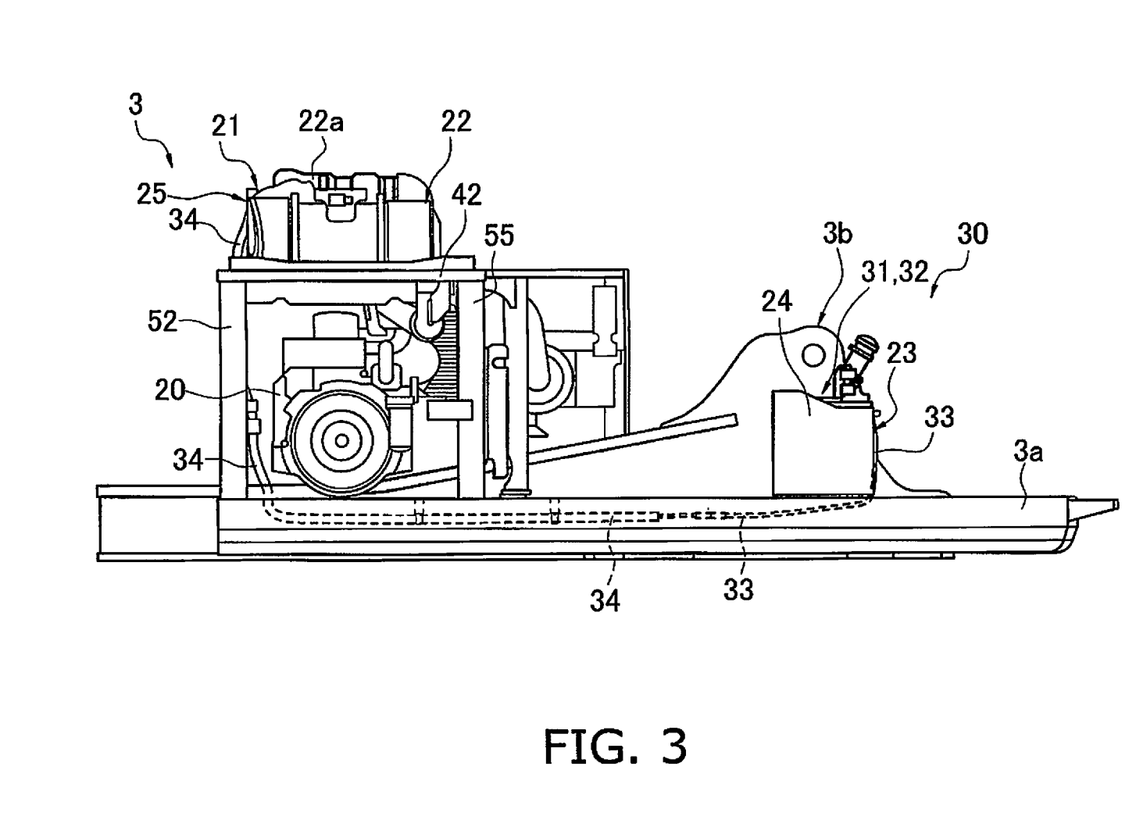
FIG. 3 is a side view of a configuration disposed on the vehicle body frame of the hydraulic excavator of FIG. 1.
Figure 4:
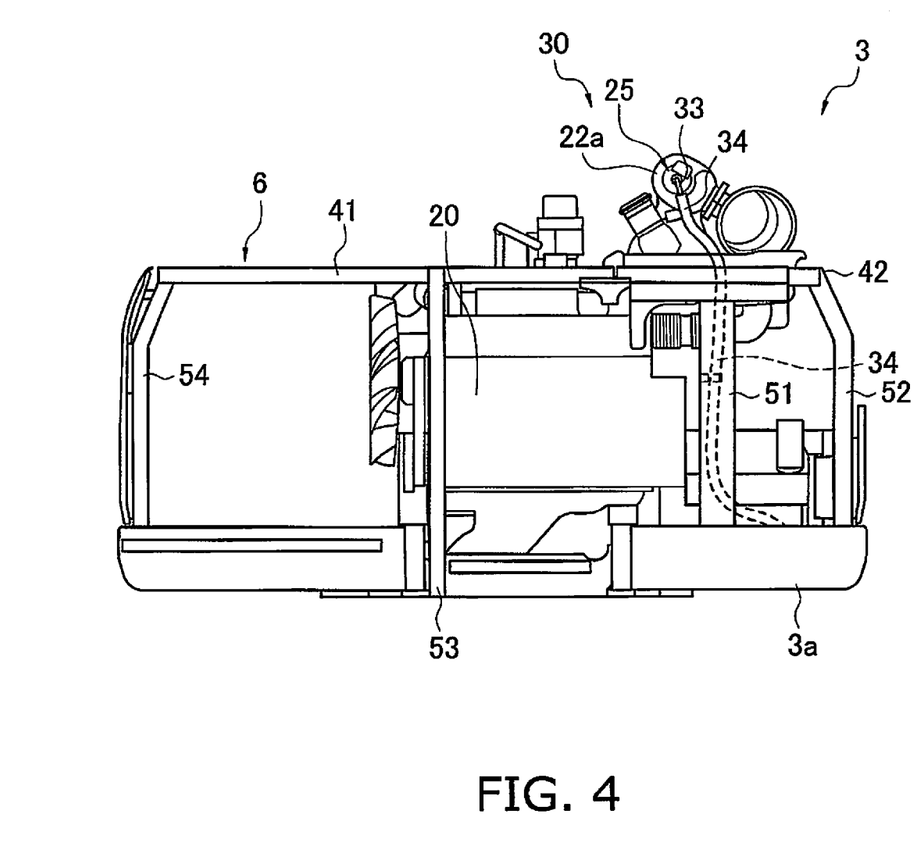
FIG. 4 is a rear view of a configuration disposed on the vehicle body frame of the hydraulic excavator of FIG. 1.

The plurality of pillar members 51 to 56 are disposed to extend upward from the upper face of the vehicle body frame 3a. The beam members 41 to 43 are attached substantially horizontally in a state of being connected to the upper end portions of the pillar members 51 to 56. More specifically, as shown in FIGS. 2 to 4, the plurality of beam members 41 and 43 are respectively disposed in the vehicle body left and right direction at positions separated in the front and back direction.

The beam member 41 is connected at both ends to the upper end portions of the pillar members 52 and 56, and disposed to the rear of the engine 20.

The beam member 42 is connected at both ends to the upper end portions of the pillar members 52 and 55, and disposed on the right side of the engine 20.

The beam member 43 is connected at both ends to the upper end portions of the pillar members 55 and 56, and disposed to the front of the engine 20.

The work implement 4 (see FIG. 1) is configured to include a boom 11 attached in an operable state on a boom attachment component 3b of the upper structure 3, an arm 12 attached to the distal end of the boom 11, and a bucket 13 attached to the distal end of the arm 12. The work implement 4 is designed such that hydraulic cylinders 11a, 12a, 13a, etc., included in a hydraulic circuit (not shown) move the boom 11, the arm 12, the bucket 13, etc., up and down while performing excavation work of dirt, gravel, etc., at a construction site.

The counterweight 5 includes, for example, a box made of sheet metal and filled with scrap iron, concrete, or the like, and is provided to balance the body during digging or the like. More specifically, the counterweight 5 is disposed on a center frame 3c (see FIG. 2c, etc.) provided to the rear of the vehicle body 6 on the upper structure 3.

As shown in FIG. 1, the vehicle body 6 is disposed at a position adjacent to the counterweight 5, and has the engine compartment 10, which holds the engine 20 and so forth in its interior.

The mechanical compartment 7 is disposed to the rear of the work implement 4 on the upper structure 3, and holds a fuel tank, a hydraulic fluid tank, control valves, and so forth.

The cab 8 has an interior space in which the operator of the hydraulic excavator 1 rides, and is disposed at the left-front side, which is to the side of the work implement 4, on the upper structure 3 to afford a view of a distal end of the work implement 4.

The engine compartment 10 has an upper opening that is used for inspection and covered by an engine hood 14 that can be opened and closed. As shown in FIG. 2, the engine compartment 10 houses in its interior the engine 20, a DPF (Diesel Particulate Filter) 21, an SCR (Selective Catalytic Reduction) 22, a urea aqueous solution injection device (reductant injection device) 25, and so forth.

The engine 20 is supported via rubber dampers on the center frame 3c, which is part of the vehicle body frame 3a of the upper structure 3.

The DPF 21 is a device that treats the exhaust gas discharged from the engine 20, and uses a filter to trap particulate matter contained in the exhaust gas. The particulate matter trapped by the filter is incinerated inside the DPF 21. The DPF 21 has a substantially cylindrical shape, and as shown in FIG. 2, its center axis is disposed in the front and back direction. Furthermore, the DPF 21 is disposed to be bounded in the front and back direction by the beam members 41 and 43 and on the right side by the beam member 42.

The SCR 22 is a device that treats the exhaust gas that has been treated by the DPF 21 after being discharged from the engine 20, and uses ammonia obtained by the hydrolysis of urea to selectively reduce nitrogen oxides (NOx). As shown in FIG. 2, the SCR 22 is disposed adjacent to and to the side of the DPF 21. The SCR 22 has a substantially cylindrical shape, and is disposed so that its center axis runs in the front and back direction. The SCR 22 is also disposed so that its bottom portion is lower than the upper face of the engine 20. Further, as shown in FIG. 3, the bottom portion of the SCR 22 is disposed lower than the beam members 41 and 42, and the upper face portion of the SCR 22 is disposed above the beam members 41 and 42. The SCR 22 is similar to the DPF 21 in that it is disposed to be bounded in the front and back direction by the beam members 41 and 43 and on the right side by the beam member 42.

The urea aqueous solution injection device 25 is mounted in a mixing pipe 22a connecting the SCR 22 and the DPF 21 treating the exhaust gas discharged from the engine 20, and injects an aqueous solution of urea into the mixing pipe 22a.

Also, a urea aqueous solution tank (reductant tank) 23, a pump (reductant pump) 24 for supplying an aqueous solution of urea (an example of a reductant) to the urea aqueous solution injection device 25, and so forth are disposed on the outside of the engine compartment 10 and in the interior of the vehicle body 6.

The above-mentioned engine 20, DPF 21, and SCR 22 are connected in series in that order. Therefore, exhaust gas discharged from the engine 20 is first sent to and treated at the DPF 21 (mainly a treatment to reduce particulate matter), after which it is sent through the mixing pipe 22a to the SCR 22. At the SCR 22, the gas is mainly treated to reduce NOx, after which the cleaned exhaust gas is discharged to the outside.

The configuration of the urea aqueous solution injection system that includes the urea aqueous solution injection device 25 will be discussed below.

Urea Aqueous Solution Injection System 30

As shown in FIGS. 2 to 4, the urea aqueous solution injection system 30 is configured to include the urea aqueous solution tank 23, the pump 24, the urea aqueous solution injection device 25, first pipes 31 and 32, and a second pipe 33.

The urea aqueous solution tank 23 stores an aqueous solution of urea as a reductant, and as shown in FIG. 2, is disposed on the right side on the vehicle body frame 3a, and to the front of the engine compartment 10. In other words, the urea aqueous solution tank 23 is disposed outside the engine compartment 10 to keep the aqueous solution of urea that it holds from being modified into ammonia under a high-temperature environment. An end 31a of the outflow-side first pipe 31 and an end 32a of the inflow-side first pipe 32 are connected to the upper face of the urea aqueous solution tank 23.

Figure 5:
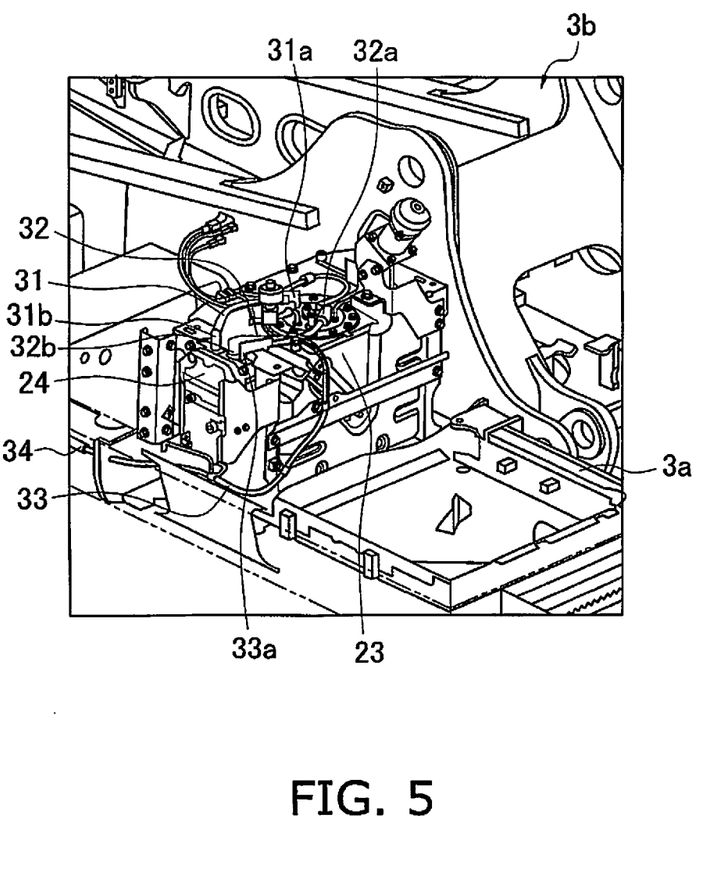
FIG. 5 is a detail view of the configuration around the urea aqueous solution tank disposed on the vehicle body frame of the hydraulic excavator of FIG. 1.

The pump 24 draws up the aqueous solution of urea held in the urea aqueous solution tank 23, and pumps it through the first and second pipes 31 and 33 to the urea aqueous solution injection device 25. As shown in FIG. 3, the pump 24 is disposed next to the urea aqueous solution tank 23. More precisely, as shown in FIG. 5, the pump 24 is attached to the side face of the urea aqueous solution tank 23. Also, the end 31b of the first pipe 31, the end 32b of the first pipe 32, and the end 33a of the second pipe are connected to the upper face of the pump 24.

Figure 6:
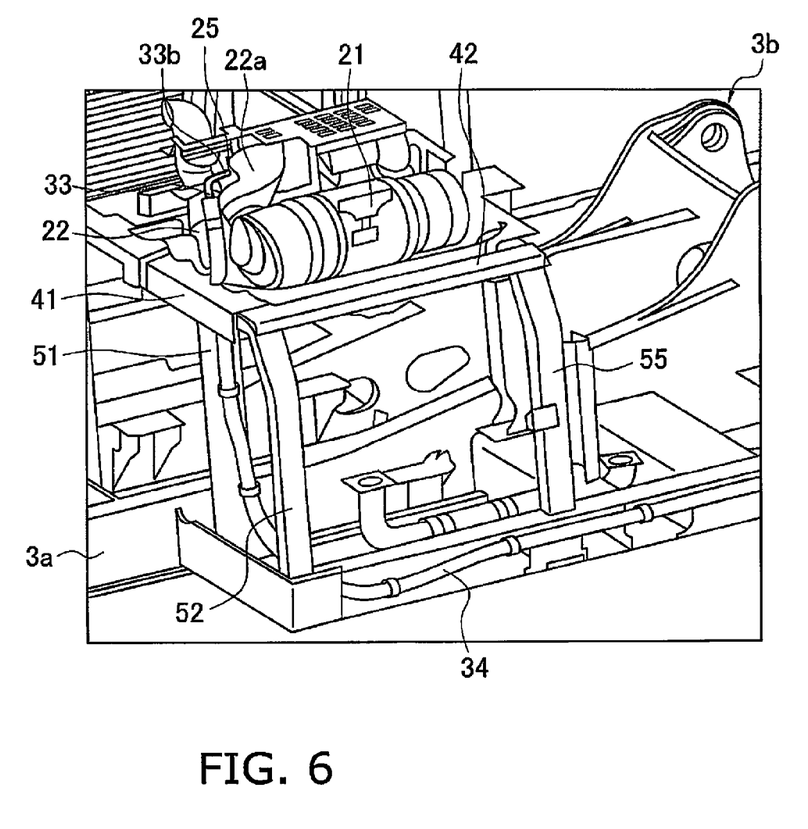
FIG. 6 is an oblique view of the configuration around the urea aqueous solution injection device disposed on the vehicle body frame of the hydraulic excavator in FIG. 1.
Figure 7:
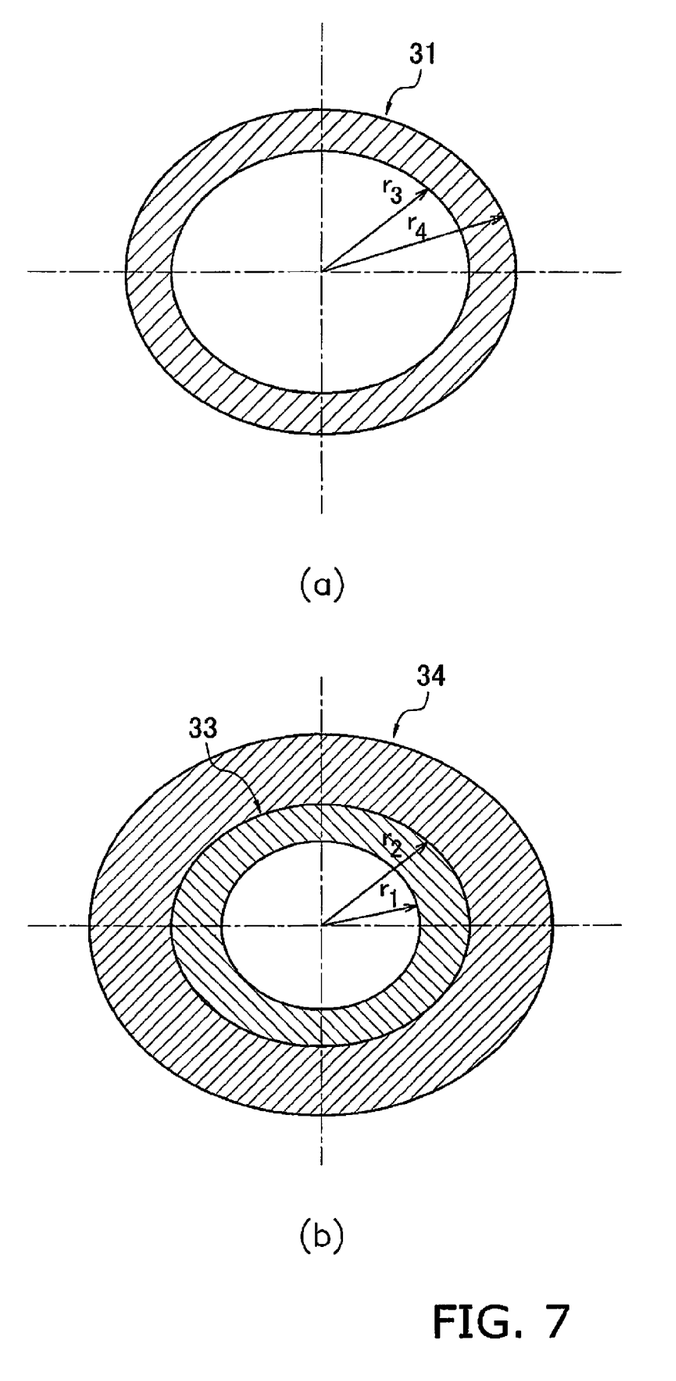
FIGS. 7a and 7b are cross sectional views showing an inside diameter of a pipe for supplying reductant, installed in the hydraulic excavator in FIG. 1.

As shown in FIG. 6, the urea aqueous solution injection device 25 is attached to the mixing pipe 22a that links the above-mentioned DPF 21 and SCR 22. The end 33b of the second pipe 33 is attached to the urea aqueous solution injection device 25. The urea aqueous solution injection device 25 atomizes the aqueous solution of urea supplied by the pump 24 from the urea aqueous solution tank 23 and through the first pipe 31 and the second pipe 33, and sprays it into the exhaust gas passing through the mixing pipe 22a.

As shown in FIG. 5, the first pipes 31 and 32 are attached to link the urea aqueous solution tank 23 and the pump 24.

The first pipe 31 guides the aqueous solution of urea drawn up by the pump 24 from the urea aqueous solution tank 23 to the pump 24. The end 31a of the first pipe 31 is connected to the upper face of the urea aqueous solution tank 23, and the end 31b on the opposite side from the end 31a is connected to the upper face of the pump 24.

The first pipe 32 is provided to return the aqueous solution of urea drawn up from the urea aqueous solution tank 23 by the pump 24 to the urea aqueous solution tank 23. The first pipe 32 is similar to the first pipe 31 in that it is connected at one end 32a to the upper face of the urea aqueous solution tank 23, and at the end 32a on the opposite side from the end 32a to the upper face of the pump 24.

The second pipe 33 is used to link the pump 24 and the urea aqueous solution injection device 25 to supply the aqueous solution of urea from the pump 24 to the urea aqueous solution injection device 25, and as shown in FIG. 3, is provided near the side face of the vehicle body frame 3a. The second pipe 33 is connected at one end 33a to the upper face of the pump 24, and at the end 33b on the opposite side from the end 33a to the urea aqueous solution injection device 25. As shown in FIGS. 2 to 4, the outer peripheral face of the second pipe 33 is covered by an adiabatic material 34 from a position before going into the engine compartment 10 from the pump 24, up to a position reaching the urea aqueous solution injection device 25. The second pipe 33 is also formed so that its inside diameter is smaller than that of the first pipe 31 to increase heat resistance.

As discussed above, the urea aqueous solution tank 23 and the pump 24 here are disposed on the outside of the engine compartment 10 to keep the aqueous solution of urea in the second pipe 33 from being exposed to a high-temperature environment. On the other hand, the urea aqueous solution injection device 25 is disposed in the engine compartment 10 because it is attached to the mixing pipe 22a that connects the DPF 21 and the SCR 22.

Thus, the second pipe 33 that connects the pump 24 and the urea aqueous solution injection device 25 is naturally disposed so that at least part of it passes through the engine compartment 10. Accordingly, various measures are taken with the second pipe 33 to prevent the aqueous solution of urea supplied to the urea aqueous solution injection device 25 from being modified into ammonia.

More specifically, as shown in FIG. 5, the second pipe 33 is guided from the upper face of the pump 24 to which the one end 33a is connected, passing near the side face of the urea aqueous solution tank 23, and to the side of the vehicle body frame 3a. The outer peripheral face of the second pipe 33 is wrapped with the adiabatic material 34 at a position prior to entering the engine compartment 10 to the side of the vehicle body frame 3a. Then, the second pipe 33 is installed substantially in the horizontal direction up to the position of the pillar member 52 as shown in FIG. 3, in a state in which its outer peripheral face is wrapped with the adiabatic material 34. As shown in FIG. 4, the second pipe 33 is also installed facing substantially vertically upward along the pillar member 51 adjacent to the pillar member 52. The second pipe 33 installed along the pillar member 51 extends above the beam member 41 and is connected at its end 33b to the urea aqueous solution injection device 25.

Consequently, the aqueous solution of urea held in the urea aqueous solution tank 23 moves through the first pipe 31 to the pump 24, and is supplied through the second pipe 33 to the urea aqueous solution injection device 25.

Heat Resistance of Second Pipe 33

As discussed above, with the hydraulic excavator 1 in this exemplary embodiment, the aqueous solution of urea held in the urea aqueous solution tank 23 is moved through the first pipe 31 to the pump 24, and supplied from the pump 24 through the second pipe 33 to the urea aqueous solution injection device 25. The second pipe 33 is formed with a smaller inside diameter than the first pipe 31.

More specifically, as shown in FIG. 7a, if we let r3 be the inside diameter of the first pipe 31 and r4 the outside diameter, and as shown in FIG. 7b, if we let r1 be the inside diameter of the second pipe 33 and r2 the outside diameter, the first and second pipes 31 and 33 in this exemplary embodiment are formed so that r1<r3.

Here, as shown in FIGS. 7a and 7b, if the wall thickness of the first and second pipes 31 and 33 are substantially the same (r4−r3≈r2−r1), the surface area of the second pipe 33 will be smaller than that of the first pipe 31. Thus, the amount of heat to which the second pipe 33 is subjected from the outside can be reduced, so the heat resistance of the pipe can be increased, which reduces the effect of heat on the aqueous solution of urea flowing through the second pipe 33.

For example, if r1=3 mm, r2=5 mm, r3=6 mm, and r4=8 mm, the first pipe 31 and the second pipe 33 will both have a wall thickness of 2 mm.

The heat resistance of the pipes here is proportional to the ln of the outside diameter/inside diameter, so if we compare the heat resistance ln (8/6) of the first pipe 31 (0.28) to the heat resistance ln (5/3) of the second pipe 33 (0.51), we see that the second pipe 33 has heat resistance that is 1.82 times (≈0.51/0.28) that of the first pipe 31.

Consequently, the second pipe 33 installed in the engine compartment 10 is subjected to less effect from heat than when the second pipe 33 is the same as the first pipe 31, and this suppresses an increase in the temperature of the aqueous solution of urea flowing through the second pipe 33. As a result, this prevents the service life of the urea aqueous solution injection device 25 from being shortened by adhesion of the aqueous solution of urea to the injection nozzle when the temperature of the aqueous solution of urea rises immediately prior to injection, and also suppresses the modification to ammonia that occurs when the aqueous solution of urea is exposed for an extended period to a high-temperature environment.

The second pipe 33 is wrapped with the adiabatic material 34 as shown in FIG. 7b, at the portion that passes through the interior of the engine compartment 10.

Consequently, the second pipe 33 installed in the engine compartment 10 is almost completely free of the effect of external heat even under the high-temperature environment of the engine compartment 10, which prevents a shortening of the service life of the urea aqueous solution injection device 25 and the modification of the aqueous solution of urea.

OTHER EXEMPLARY EMBODIMENTS

An embodiment of the present invention was described above, but the present invention is not limited to or by the above embodiment, and various modifications are possible without departing from the gist of the invention.

In the above exemplary embodiment, an example was described in which the DPF 21 and the SCR 22 were disposed aligned in the vehicle width direction, but the present invention is not limited to this.

For example, the DPF 21 and the SCR 22 may be disposed aligned in a direction other than the vehicle width direction, such as their being aligned in the front and back direction of the vehicle.

In the above exemplary embodiment, an example was described in which the DPF 21 and the SCR 22 both had a cylindrical shape, but the present invention is not limited to this.

For example, the DPF 21 is not limited to being cylindrical, and may have some other shape, such as elliptical or cuboid. The SCR 22 is not limited to being cylindrical, either, and may have some other shape, such as elliptical or cuboid.

In the above exemplary embodiment, an example was described in which the urea aqueous solution tank 23, the pump 24, and so forth were disposed on the right side on the vehicle body frame 3a, but the present invention is not limited to this.

For example, depending on the orientation of the DPF, the SCR, or the engine installed in the engine compartment, these components may be provided at some other position, as long as it is outside the engine compartment, such as on the left side on the vehicle body frame.

In the above exemplary embodiment, an example was described in which an aqueous solution of urea was used as the reductant, but the present invention is not limited to this.

For example, some other reductant besides an aqueous solution of urea may be used.

In the above exemplary embodiment, an example was described in which the work vehicle was a hydraulic excavator, but the present invention is not limited to this.

For example, the present invention can also be applied to some other work vehicle, such as a wheel loader, a bulldozer, or a dump truck.

The work vehicle in accordance with exemplary embodiments of the present invention has the effect of suppressing an increase in the temperature of a reductant supplied to a reductant injection device, and therefore can be widely applied to various kinds of work vehicles in which a reductant injection device is installed.

The invention claimed is:
1. A work vehicle, comprising:
 a reductant injection device disposed in the engine compartment, and the reductant injection device being configured to inject a reductant used for cleaning exhaust gas;
 a reductant tank configured to store the reductant;
 a reductant pump configured to draw up the reductant from the reductant tank and supply the reductant to the reductant injection device;
 a first pipe that connects the reductant tank to the reductant pump, and the first pipe being configured to supply the reductant from the reductant tank to the reductant pump; and
 a second pipe that connects the reductant pump to the reductant injection device and having a smaller inside diameter than the first pipe, and the second pipe being configured to supply the reductant from the reductant pump to the reductant injection device.
2. The work vehicle according to claim 1, wherein
 the second pipe passes through the engine compartment in which the engine is disposed.
3. The work vehicle according to claim 1, wherein
 the reductant injection device is disposed on the vehicle body rear side of the engine in the engine compartment.

4. The work vehicle according to claim 1, wherein the reductant tank and the reductant pump are disposed on the outside of the engine compartment and on the vehicle body front side of the engine compartment.

5. The work vehicle according to claim 1, wherein the reductant is an aqueous solution of urea.

6. The work vehicle according to claim 2, wherein the reductant injection device is disposed on the vehicle body rear side of the engine in the engine compartment.

7. The work vehicle according to claim 2, wherein the reductant tank and the reductant pump are disposed on the outside of the engine compartment and on the vehicle body front side of the engine compartment.

8. The work vehicle according to claim 2, wherein the reductant is an aqueous solution of urea.

9. The work vehicle according to claim 6, wherein the reductant tank and the reductant pump are disposed on the outside of the engine compartment and on the vehicle body front side of the engine compartment.

10. The work vehicle according to claim 6, wherein the reductant is an aqueous solution of urea.

\* \* \* \* \*